(12) United States Patent
Raghavan et al.

(10) Patent No.: US 10,599,168 B2
(45) Date of Patent: Mar. 24, 2020

(54) FOOD SERVICE OVEN WITH MULTIPOINT TEMPERATURE MONITORING

(71) Applicant: ALTO-SHAAM, INC., Menomonee Falls, WI (US)

(72) Inventors: J. K. Raghavan, Mequon, WI (US); Andy Tischendorf, Campbellsport, WI (US)

(73) Assignee: Alto-Shaam, Inc., Menomonee Falls, WI (US)

( * ) Notice: Subject to any disclaimer, the term of this patent is extended or adjusted under 35 U.S.C. 154(b) by 375 days.

(21) Appl. No.: 15/615,110

(22) Filed: Jun. 6, 2017

(65) Prior Publication Data

US 2017/0351278 A1   Dec. 7, 2017

Related U.S. Application Data

(60) Provisional application No. 62/346,026, filed on Jun. 6, 2016.

(51) Int. Cl.
| | |
|---|---|
| *H05B 3/02* | (2006.01) |
| *H05B 1/02* | (2006.01) |
| *F24C 15/32* | (2006.01) |
| *A47J 27/62* | (2006.01) |
| *G05D 23/19* | (2006.01) |
| *G01K 1/02* | (2006.01) |
| *A47J 37/00* | (2006.01) |
| *G01K 3/14* | (2006.01) |

(52) U.S. Cl.
CPC .......... *G05D 23/1934* (2013.01); *A47J 37/00* (2013.01); *G01K 1/026* (2013.01); *G01K 3/14* (2013.01); *G05D 23/1931* (2013.01); *G01K 2003/145* (2013.01); *G01K 2207/06* (2013.01)

(58) Field of Classification Search
CPC .... G01K 3/14; G01K 1/026; G01K 2003/145; G01K 2207/06; G05D 23/1934; G05D 23/1931; A47J 37/00
USPC ....... 219/710, 679, 680, 681, 682, 683, 685, 219/711, 712, 716, 441, 391, 401, 413, 219/476, 400, 489, 486, 490, 483, 488, 219/506, 508, 497; 126/19 R, 21 A; 99/331, 476
See application file for complete search history.

(56) References Cited

U.S. PATENT DOCUMENTS

| | | | |
|---|---|---|---|
| 4,415,799 A | 11/1983 | Tanaka et al. | |
| 4,467,777 A | 8/1984 | Weber | |
| 4,782,445 A | 11/1988 | Pasquini | |
| 5,723,846 A | 3/1998 | Koether et al. | |

(Continued)

*Primary Examiner* — Quang T Van
(74) *Attorney, Agent, or Firm* — Boyle Fredrickson S.C.

(57) ABSTRACT

An oven having multiple oven cavity temperature sensors that provide improved monitoring of oven temperature and that permit improved oven temperature control is provided. Multiple temperature values from the different sensors may be combined or analyzed to provide a more consistent and accurate measurement of the temperature of the food being cooked. Patterns of temperature as a function of location in the oven cavity may be analyzed to detect abnormal but correctable temperature inhomogeneities (for example, cold spots or stratification) and used to adjust parameters of the oven control, (for example, by fan speed/direction adjustment, cycle control of the fan and heater elements) to provide more even temperature distributions.

19 Claims, 4 Drawing Sheets

(56) References Cited

U.S. PATENT DOCUMENTS

| | | |
|---|---|---|
| 6,000,845 A | 12/1999 | Tymkewicz et al. |
| 6,734,403 B2 | 5/2004 | Baker et al. |
| 8,859,941 B2 | 10/2014 | Gladhill et al. |
| 9,182,296 B2 | 11/2015 | Bach et al. |
| 2006/0016801 A1 | 1/2006 | Kitabayashi et al. |
| 2009/0090347 A1* | 4/2009 | Kim ................. F24C 7/082 126/21 A |
| 2012/0017769 A1* | 1/2012 | Inoue ................. F24C 7/08 99/331 |
| 2014/0319119 A1 | 10/2014 | Raghavan et al. |
| 2015/0359047 A1 | 12/2015 | Kishimoto et al. |
| 2017/0089770 A1 | 3/2017 | Bugglin |

* cited by examiner

FOOD SERVICE OVEN WITH MULTIPOINT TEMPERATURE MONITORING

CROSS-REFERENCE TO RELATED APPLICATIONS

This application claims the benefit of U.S. provisional application No. 62/346,026 filed Jun. 6, 2016 and hereby incorporated by reference.

BACKGROUND OF THE INVENTION

The present invention relates to ovens for preparing food and in particular to an oven that can provide for more accurate temperature monitoring and temperature control.

High-end commercial ovens may provide for multiple cooking modes including heat augmented with forced airflow (convection) and heat augmented with steam. Generally, convection cooking uses a fan to disrupt the insulating effect of stagnant air around the food, increasing the heat flow to the food. This increased heat flow may be used, for example, to promote surface browning of the food. In contrast, the application of steam (typically also with operation of the convection fan but may also inject steam directly onto a heating element without operation of the convection fan) can provide for fast cooking while retaining food moisture, flavors, and nutrients. Steam cooking generally prevents surface browning. These different modes may be combined in sequence during a cooking cycle, for example, to rapidly cook meat and then to brown its surface. Commercial ovens may also provide "cook and hold" modes including heat surrounded cavities without the use of convection fans, forced air, or application of steam to allow even cooking with greater moisture.

Different heat sources are commonly used for ovens including electrical heating elements, which employ electrical current passing through a resistance in communication with the oven cavity, and gas heating elements, which provide for the combustion of gas and the circulation of the combustion exhaust through a heat exchanger in communication with the oven cavity. Temperature control of the oven is typically provided by switching the electrical current or the gas on and off according to a sensed temperature of the oven cavity. Such switching between on and off states greatly simplifies the control of the electrical current and gas elements.

Ovens of this type are commercially available from Alto-Shaam, Inc. of Menomonee Falls, Wis., and are described generally in U.S. Pat. No. 6,188,045, entitled "Combination Oven with Three Stage Water Atomizer" hereby incorporated by reference.

Ovens normally operate according to a feedback control system in which a desired oven temperature is compared against an actual measure of the oven cavity temperature and the difference used to control the heating element. The oven cavity temperature is normally measured by an electronic temperature sensor such as a resistive temperature detector (RTD), thermocouple, or solid-state temperature sensor. The desired oven temperature (also termed the set point temperature) can be entered by the user through a panel control or the like.

Often the temperature measured by the electronic temperature sensor may fail to accurately reflect the cooking temperature of the food in the oven. This can be because of temperature stratification (for example, caused by convection) where the temperature sensor senses an extreme in temperature that is not representative of the general oven temperature, radiant energy absorption by the sensor directly or reflected from the walls of the oven, temperature "shadowing" by a product placed near the location of the sensor that cools the air around the sensor, water or moisture on the sensors causing poor sensing, and "dead zones" in which the temperature sensor is located in an air pocket that is isolated from other oven air, for example, by food tightly packed on the racks or as a result of persistent airflow patterns.

SUMMARY OF THE INVENTION

The present invention provides an oven having multiple oven cavity temperature sensors that provide improved monitoring of oven temperature and that permit improved oven temperature control. Multiple temperature values from the different sensors may be combined or analyzed to provide a more consistent and accurate measurement of the temperature of the food being cooked. Patterns of temperature as a function of location in the oven cavity may be analyzed to detect abnormal but correctable temperature inhomogeneities (for example, cold spots or stratification) and used to adjust parameters of the oven control, (for example, by fan speed/direction adjustment, cycle control of the fan and heater elements) to provide more even temperature distributions.

In one embodiment, an improved temperature value obtained from the multiple temperature sensors may be used to auto calibrate a food probe that may be inserted into the food during cooking. Specifically, at least one embodiment of the invention provides a cooking oven having an insulated housing having housing walls including a door closing to define an interior cooking cavity and opening to provide access to the cooking cavity, a cooking cavity heater communicating with the cooking cavity to heat the cooking cavity, a fan for circulating heated air through the cooking cavity, at least two temperature sensors coupled to interior walls of the cooking cavity and each providing a separate temperature signal, and an electronic controller executing a stored program upon selection of a cooking temperature set point by a user through a user interface that communicates with the electronic controller. The electronic controller executes the stored program to: (i) detect the separate temperature signals of the at least two temperature sensors; (ii) compare the temperature signals of the at least two temperature sensors; and (iii) operate the fan based on the compared temperature signals.

It is thus a feature of at least one embodiment of the invention to use multiple oven sensors to detect thermal stratification and "dead zones" within the oven cavity and operate the fan to minimize their effects.

In this regard, at least two temperature sensors may be compared to determine whether there is a temperature difference above a predetermined amount.

It is thus a feature of at least one embodiment of the invention to recognize that large deviations between sensor temperatures may indicate regions of probe failure, dead zone, or stagnant air.

Two temperature sensors may be on separate walls of the interior cooking cavity. Two temperature sensors may be vertically separated to detect temperature stratification.

It is thus a feature of at least one embodiment of the invention to collect temperature information along all dimensions (x, y, and z) of the cooking cavity in order to capture possible dead zones and stratification effects caused by the rise of heat within the cooking cavity.

The fan may be operated at different operating speeds based upon the compared temperature signals. The fan may be operated at different directions of rotation based upon the compared temperature signals.

It is thus a feature of at least one embodiment of the invention to break up and circulate stagnant air that might built up around food products. Different techniques may be used to minimize dead zones versus stratification, such as bursts of air to break up stratification.

The cooking oven may further comprise a steam generator generating steam within the cooking cavity. The electronic controller may further operate the steam generator based on the compared temperature signals to adjust steam generation.

It is thus a feature of at least one embodiment of the invention to break up stagnant air and to ensure food does not dry out in high temperature portions of the stratification.

The electronic controller may change the cooking temperature set point based on the compared temperature signals. The electronic controller may further operate the cooking cavity heater based on the compared temperature signals to change the power level or duty cycle of the heater.

It is thus a feature of at least one embodiment of the invention to ensure proper cooking in low temperature portions of the stratification.

The user may select a preprogrammed cooking schedule for cooking a particular food at a time-defined cooking temperature set point.

It is thus a feature of at least one embodiment of the invention to adjust all future cooking operations of the user defined cooking schedule in response to the compared temperature sensors.

The user may receive a notification on the user interface indicating a recommendation to rearrange food or oven racks.

It is thus a feature of at least one embodiment of the invention to alert the user if the oven's correction techniques do not properly reduce dead zones or in cases of extreme stratification.

The electronic controller may further execute the stored program to detect an outlier sensor sensing a temperature that deviates from a temperature sensed by the other sensors by a predetermined amount and determine whether there is a correlation between the temperature sensed by the outlier sensor and a calculated oven cavity temperature indicating a dead zone or no correlation between the temperature sensed by the outlier sensor and a calculated oven cavity temperature indicating a sensor failure.

It is thus a feature of at least one embodiment of the invention to distinguish between a dead zone and sensor failure so that there is unnecessary food loss (by either allowing cooking to resume or to correct for dead zones/ stratification which could result in burnt or uncooked food).

The electronic controller may further execute the stored program to save a history of temperature signals from an outlier sensor sensing a temperature that deviates from a temperature sensed by the other sensors by a predetermined amount over time and analyze the history of temperature signals to determine if the temperature continues to deviate from the temperature sensed by the other sensors over time indicating probe failure.

It is thus a feature of at least one embodiment of the invention to recall historical data to determine if there is probe failure versus dead zone.

The user may receive a notification on the user interface indicating sensor failure.

It is thus a feature of at least one embodiment of the invention that during sensor failure, the cooking process may continue normally reducing the risk of food loss.

A temperature probe sensor may be insertable into food and held within the cooking cavity wherein the electronic controller executes the stored program to: (i) stabilize an oven cavity temperature at a cooking temperature set point; (ii) measure an offset value between the oven cavity temperature and a probe sensor temperature; and (iii) include the offset value to the probe sensor temperature to calibrate the probe.

It is thus a feature of at least one embodiment of the invention to auto calibrate a food probe that may be inserted into the food during cooking.

At least one embodiment of the invention provides a cooking oven having an insulated housing having housing walls including a door closing to define an interior cooking cavity and opening to provide access to the cooking cavity, a cooking cavity heater communicating with the cooking cavity to heat the cooking cavity, a fan for circulating heated air through the cooking cavity, at least two temperature sensors coupled to interior walls of the cooking cavity and each providing a separate temperature signal, an electronic controller executing a stored program upon selection of a cooking temperature set point by a user through a user interface that communicates with the electronic controller. The electronic controller may executes the stored program to: (i) detect the temperature signals of the at least two temperature sensors, (ii) determine a temperature stratification within the cooking cavity based on the temperature signals of the at least two temperature sensors, and (iii) control operation of the fan based on the temperature stratification within the cooking cavity to reduce temperature stratification.

Operation of the fan based on the temperature stratification within the cooking cavity may be at predetermined time intervals of less than thirty seconds.

It is thus a feature of at least one embodiment of the invention to not disrupt normal cooking operation or cooking times, and to not require constant operation of the fan.

These particular objects and advantages may apply to only some embodiments falling within the claims and thus do not define the scope of the invention.

DETAILED DESCRIPTION OF THE PREFERRED EMBODIMENT

Figure 1:
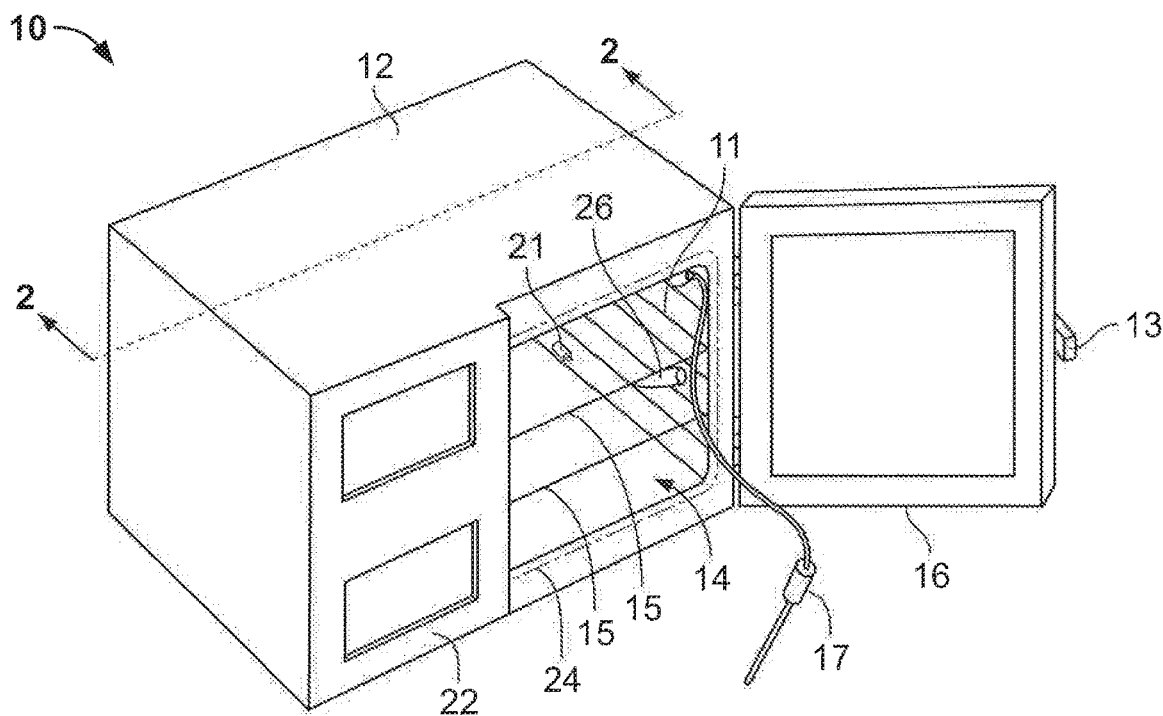
FIG. 1 is a simplified perspective view of a combination oven suitable for use with the present invention showing a housing having an openable door to reveal a cooking volume and showing a user interface on a front surface of the oven.

Referring now to FIG. 1, a combination oven 10 according to one embodiment of the present invention may provide a housing 12 defining an oven cavity 14 with sidewalls of the oven cavity 14 providing for rack supports 11 holding conventional cooking racks for supporting pans or trays of food.

The oven cavity 14 may be accessed through a door 16 connected by a hinge at one vertical side of the oven cavity 14. The door 16 may close over the oven cavity 14 during the cooking operation as held by a latch assembly 13 (visible on the door 16 only). In the closed position, the door 16 may substantially seal against the oven cavity 14 by compressing a gasket 24 surrounding an opening of the oven cavity 14 in the housing 12. Positioned within the oven cavity 14 may be one or more racks 15 on which food items may be placed for cooking. A food probe 17 may provide a temperature sensor that may be inserted into cooking food to monitor internal food cooking temperatures. A holster 26 may be attached to a sidewall of the oven cavity 14 when the probe is not in use. In addition, one of the racks 15 may hold a probe position clip 21 allowing the probe 17 to be used to monitor air temperature in the vicinity of the food in one embodiment to be described below.

At one side of the oven cavity 14, the housing 12 may support a control panel 22 accessible by a user standing at a front of the oven 10. The control panel 22 may provide conventional electronic controls such as switches, buttons, a touchscreen or the like that may receive oven control data from the user as will be described below.

Figure 2:
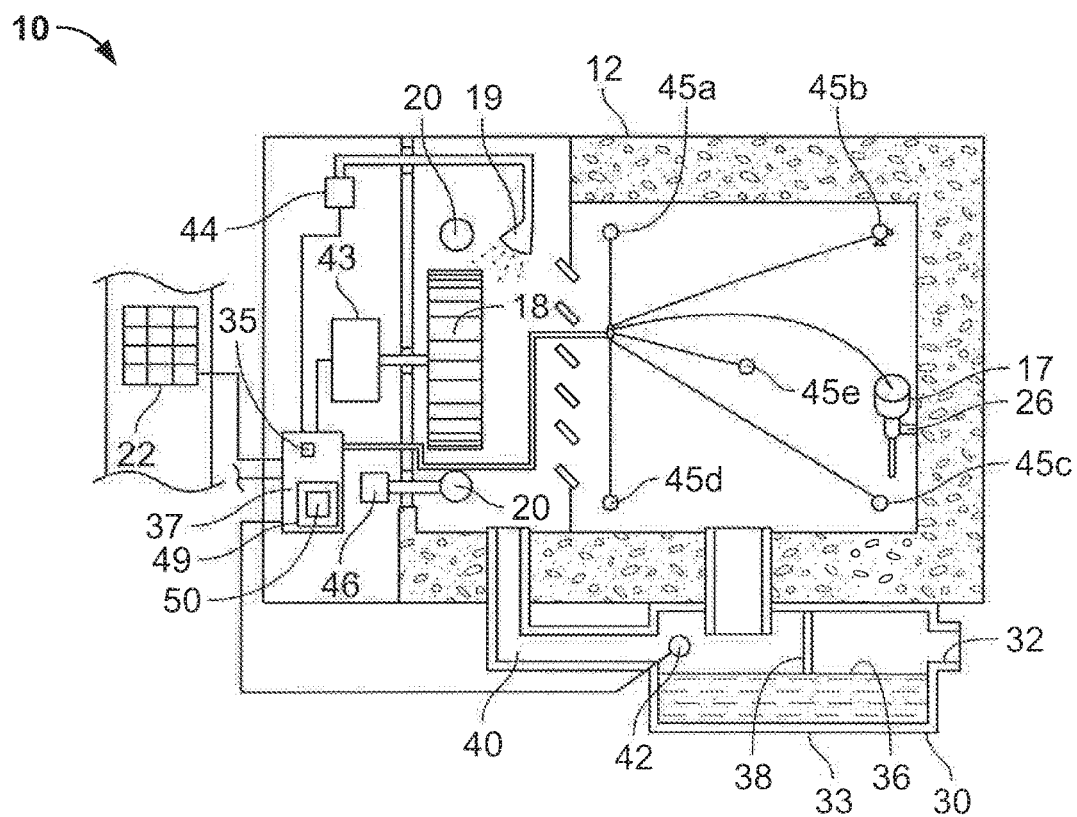
FIG. 2 is a section along line 2-2 of FIG. 1 showing internal components of the combination oven including a control unit, a convection fan, a heater unit, and multiple temperature sensors dispersed in the cooking volume all communicating with the control unit.

Referring now also to FIG. 2, a motor-driven convection fan 18 may be optionally positioned within the housing 12 to direct a stream of air across a heater element 20 into the oven cavity 14. The heater element 20 may be an electric heating element or a heat exchanger receiving heat from a gas flame or the like and may surround the convection fan 18.

Steam may be introduced into the oven cavity 14, for example, by a valve-controlled water nozzle 19 directing a spray of water on the fan 18 and/or the heater element 20 proximate to the fan 18. Alternatively, steam may be provided by a separate boiler having a dedicated heater element 23 and communicating with the oven cavity 14.

Referring still to FIG. 2, a bottom wall 31 of the oven cavity 14 may expose a channel to a drainpipe 25 extending downwardly from the bottom wall 31 to a condenser chamber 30 positioned beneath the bottom wall 31. The drainpipe 25 may extend vertically (as shown) or may extend horizontally for a short distance before or after it is received within the condenser chamber 30. In either case, the drainpipe 25 allows steam and water vapor to enter the condenser chamber 30 which provides a generally enclosed box whose upstanding sidewalls retain a pool of water having a water level 36. The lower end of the drainpipe 25 passing into the condenser chamber 30 stops above the bottom wall 33 and above a water level 36.

An opposite end of the condenser chamber 30 provides an exit port 32 leading to the outside atmosphere. A baffle plate 38 extends downward from an upper surface of the chamber 30 below the water level 36 to separate the drainpipe 25 from the exit port 32 except by a path passing through the contained water. Excess pressure from cooking or from steam may escape through the drainpipe 25 bubbling through the water under the baffle plate 38 to the exit port 32. This process cools the steam and prevents excess heat from passing out of the oven cavity 14 as might occur if there were a direct path to the outer atmosphere.

A variation on this design of the condenser chamber 30 is shown in U.S. patent application Ser. No. 13/306,687 filed Nov. 29, 2011, entitled "Grease Handling Apparatus for Closed-system Oven" assigned to the same assignee as the present invention and hereby incorporated by reference.

Referring still to FIG. 2, a steam bypass conduit 40 may also lead from within the oven cavity 14 to condenser chamber 30 and to a temperature sensor 42, for example, positioned on the same side of the baffle plate 38 as the drainpipe 25. The steam bypass conduit 40 and the drainpipe 25 may be situated at slightly different regions of pressure within the oven cavity 14 when the fan 18 is operated, so that the gases near the bottom of the oven cavity 14 may flow past the temperature sensor 42 to provide a continuous sampling of air or steam from near the bottom of the oven cavity 14.

An internal controller 37 may be positioned within an equipment cavity adjacent to the oven cavity 14 but maintained at a cooler temperature. The controller 37 provides a computer processor 35 and associated memory 49, for example, flash memory, for executing a program 50 held in the associated memory. Execution of the program may generate control signals output by interface circuitry of the controller 37 to components of the oven 10 and may read sensed signals from the user and various sensors within the oven 10. For example, the controller 37 may receive signals from temperature sensor 42 in the condenser chamber 30, one or more internal oven temperature sensors 45a-e and the probe 17 in the oven cavity 14, each providing temperature signals as well as signals from the control panel 22 providing user commands. The controller 37 may output convection control signals to a motor 43 operating the fan 18 (to control a convection mode of the oven 10) providing both various fan operating speeds and operation of the fan in two different directions of rotation. The controller 37 may operate a single fan 18 within the oven cavity 14 or multiple fans 18 within the oven cavity 14 independently. In addition, the controller 37 may output steam control signals to a valve 44 communicating between a water supply and the nozzle 19 to generate steam, or alternatively to electrically controlled switch 47 communicating between line power and the heater element 23 to generate steam. In addition the controller 37 may provide a heat power signal to a heater controller 46 controlling heating elements 20 according to four states of peak power output including: off, a first peak power level, a second peak power level greater than the first peak power level and a third power level greater than the second power level. Typically, the third peak power level will be at least 10% larger than the second peak power level, for example, boosting the peak power of the heating elements from 10 kilowatts to 14 kilowatts. The operation of the controller 37 may be based upon the received temperature signals from temperature sensor 42 in the condenser chamber 30, one or more internal oven temperature sensors 45a-e and the probe 17 in the oven cavity 14 as well as signals from the control panel 22 providing user commands as further described below.

A system for providing an oven having different power capacities is described generally in U.S. patent application Ser. No. 14/260,395 filed Apr. 24, 2014, assigned to the assignee of the present invention and hereby incorporated by reference.

Figure 3:
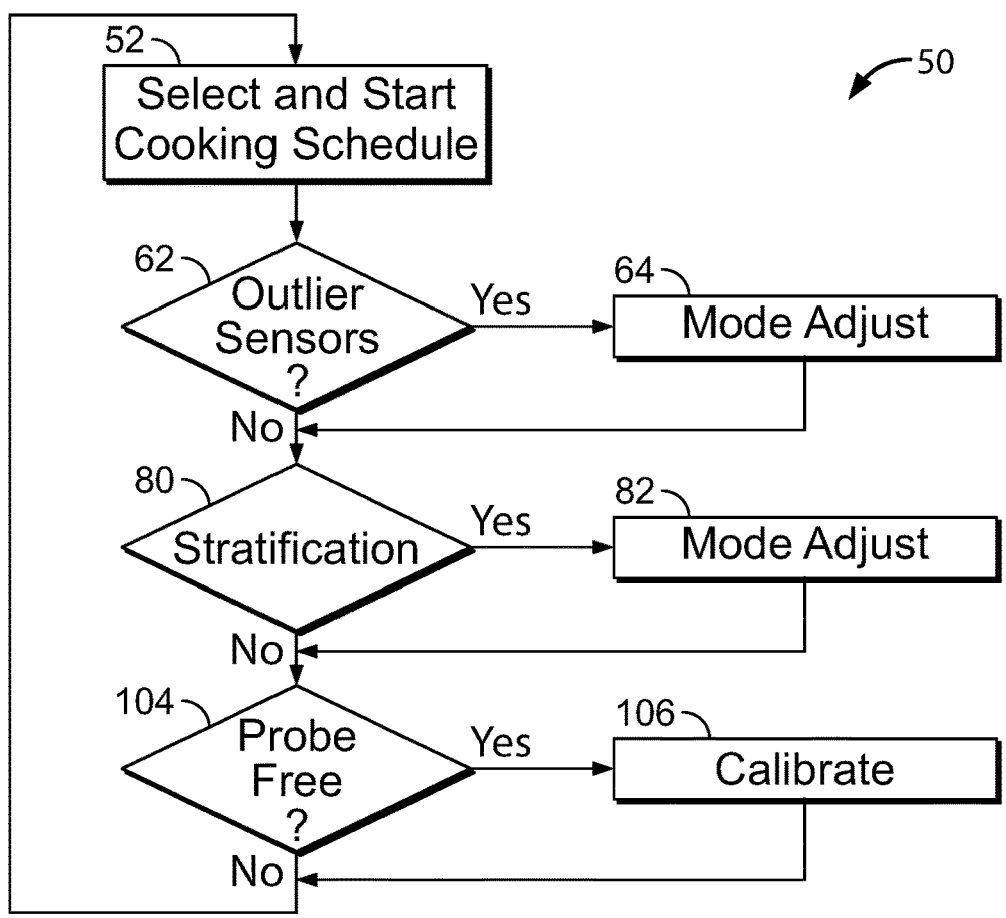
FIG. 3 is a flowchart of a program executed by the control unit to read the multiple temperature sensors and provide control to the other components of the oven.

Referring now to FIGS. 2 and 3, the program 50 executing on the controller 37 may receive a programming input from the user, for example, as entered through control panel 22 and as represented by process block 52. This mode of input will generally select either a fixed temperature and/or humidity or a predetermined "recipe" providing a schedule of cooking temperatures and/or cooking modes (convection, steam, power) that changes over time according to a predetermined timed program. Each schedule may be associated, for example, with an identified type of food preparation.

Concurrent with the control of the oven according to the schedule, per process block 52, a sampling of each of the temperature sensor 45 and of the probe 17 may be conducted to develop a temperature for the control of the heat source using a feedback control system (for example, a PID control loop).

In a simplest embodiment temperatures from each temperature sensor 45 (and optionally probe 17) may be averaged together to provide an oven cavity temperature used for control of the oven heaters.

Figure 4:
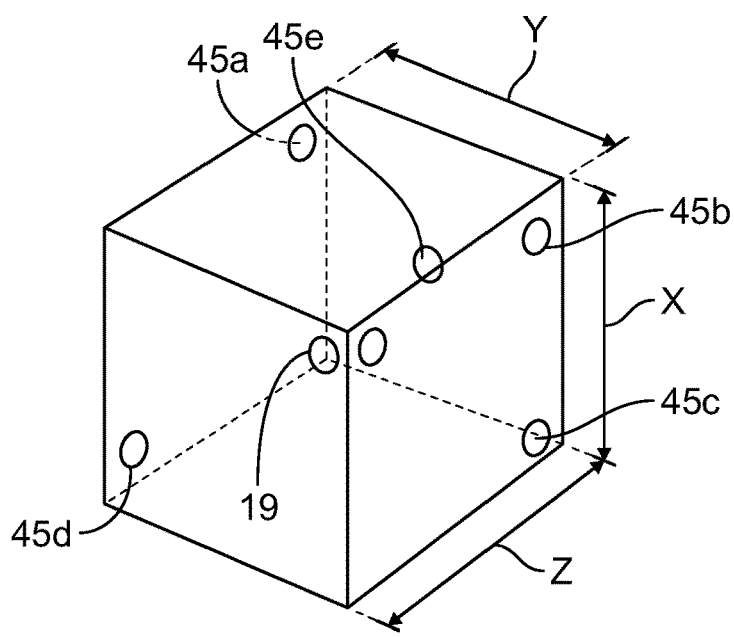
FIG. 4 is a simplified schematic of a cooking volume showing an example placement of multiple temperature sensors at different points in three dimensions.
Figure 5:
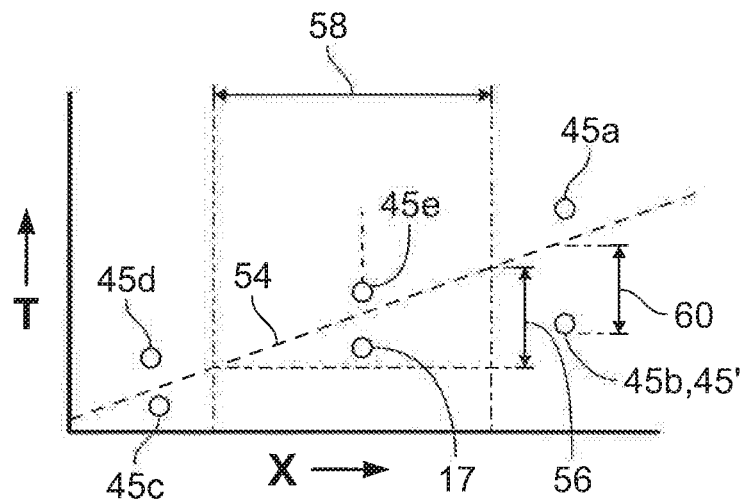
FIG. 5 is a plot of temperature sensors along one axis of FIG. 4 showing a least-squares fit for the identification of stratification and outlier temperature sensors as is used in the program of FIG. 3.

Referring now also to FIGS. 4 and 5, alternately a more sophisticated analysis of the multiple temperatures may be used in which each of the temperature sensors 45a-45e and optionally the food probe 17 collect temperature data from a known spatial location in the cooking cavity 14. The temperature sensors 45a-45e may be arranged at different locations along separate walls within the cooking cavity 14. For example, the first sensor 45a may be located on a first wall and the second sensor 45b may be located on a second wall distinct from the first wall. Also, the second sensor 45b and the third sensor 45c may be vertically separated to detect temperature stratification due to differences in elevation. It is possible than one or more temperature sensors 45a-45e may be arranged on each wall within the cooking cavity 14. Using the temperature values and the known locations of the temperature measurements, a mathematical curve fitting process (for example, least-squares fitting) may be used to fit a curve (for example, a line) along each dimension of the cooking cavity. The slope of this line represents temperature stratification in that dimension and can be used to detect cold spots.

For example, looking at the x-axis locations of each temperature sensor 45 and 17, as shown in FIG. 5, a line 54 may be fit to those temperature values as a function of the x-axis value. The slope of this line within a range 58 of x-axis values that encompasses the locations of food on the oven racks may be represented by rise value 56 being the temperature difference between highest and lowest value of line 54 within range 58. A value of line 54 at the center of range 58 may be used as a control temperature component for the control of the oven temperature.

Similar analysis may be performed along the other axes (e.g., the y-axis and the z-axis) to determine corresponding stratification values represented by corresponding rise values 56 and values of corresponding control temperature components for those axes. The control temperature components for each axis may be combined (for example, by averaging) to be used to compare to the desired temperature of the oven for control of the heater as part of the feedback loop of process block 52.

Referring still to FIG. 5, the line 54 may also be used to identify "outlier" temperature sensor 45' (in this case sensor 45b), and optionally probe 17, by looking for temperatures at probes at particular locations that deviate from the line 54 by a distance 60 more than a predetermined amount. The predetermined amount may be a fixed value or measured, for example, in standard deviation values. This detection process is indicated by decision block 62.

The temperatures measured by an outlier sensor 45' could indicate either probe failure or the existence of a dead zone. In either case, this measured temperature value may be removed from the calculation of the control temperature as indicated by process block 64, and the process described above of calculating the control temperature may be repeated without the temperature value of an outlier sensor 45' to provide increased accuracy. When probe 17 is not in the holster 26 and is within food being cooked, outlier detection may be override so that the measured temperature value from the probe 17 (being shielded by the thermal mass of the food) is removed from the calculation of the control temperature.

Figure 6:
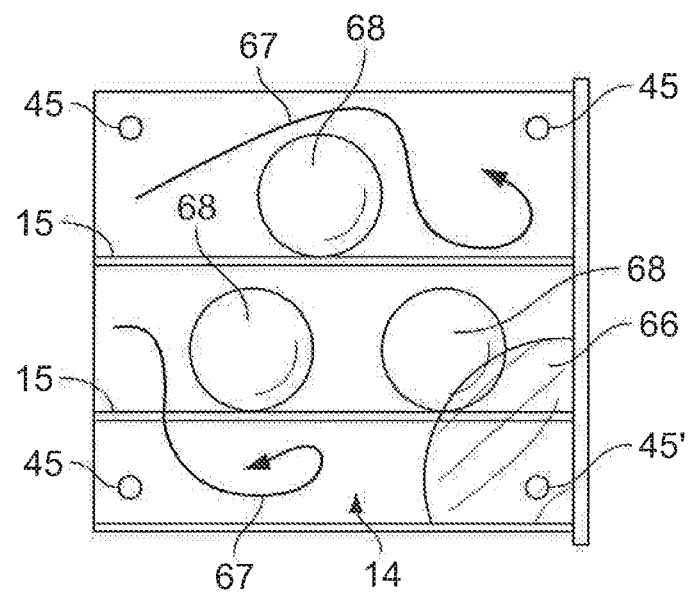
FIG. 6 is a simplified elevational view of the cooking volume showing a convection pattern producing a dead zone around one temperature sensor.

Also at process block 64, a history of the temperature signal from the outlier sensor 45' may be analyzed to determine whether the outlier sensor 45' has failed or whether it is measuring a dead zone 66 (shown in FIG. 6) of colder air. For example, a history of temperatures that are shown as outliers may indicate probe failure rather than dead zone. This failure detection process may look, for example, at whether there is any correlation between the temperature sensed by the outlier sensor 45' and the calculated oven cavity temperature (described above). Correlation suggests a functioning outlier sensor 45' in a dead zone whereas a lack of correlation (most notably caused by a constant output value by the outlier sensor 45') indicates a sensor failure. Other tests may be performed to determine whether the outlier sensor 45' has failed including, for example, a measurement of temperature outside of an expected range.

If an indication is made that the outlier sensor 45' has failed, information to this effect may be output to the user through the control panel 22. The use of multiple sensors 45 may allow the cooking process to continue such as may be evaluated by the controller 37 based on pre-established rules determined empirically during manufacture, thus reducing the risk of product loss during temperature probe failure.

In contrast to a probe failure, a dead zone 66 (shown in FIG. 6) may, for example, represent a region of stagnant air caused by the complex airflow 67 around food items 68, or properties of a particular food item 68 near the outlier sensor 45' (for example, a high thermal mass or low initial temperature of a frozen food item or the like).

Assuming that a dead zone 66 is indicated, at process block 64 the control of the oven may be varied within the constraints of the user-selected cooking schedule in an attempt to eliminate the dead zone 66. Such variation will normally not change the cooking temperature but may change any or all of: the speed of the fan 18, the direction of rotation of fan 18, operation of the valve 44 or the electrically controlled switch 47 to control steam generation, the control temperature set point, and the duty cycle and/or peak power of heater element 20.

In addition or alternatively, the user may be notified of the existence of significant dead zone 66 in order to consider rearrangement of the oven racks or take other steps. This notification may provide a rough indication of the location of the dead zone so that food in this area may be identified, for example, by a three-dimensional representation of the cooking cavity. A sensitivity of process block 64 to the existence of dead zones may be a component of the cooking schedule so that some cooking schedules are substantially more or less sensitive to such occurrences.

Figure 8:
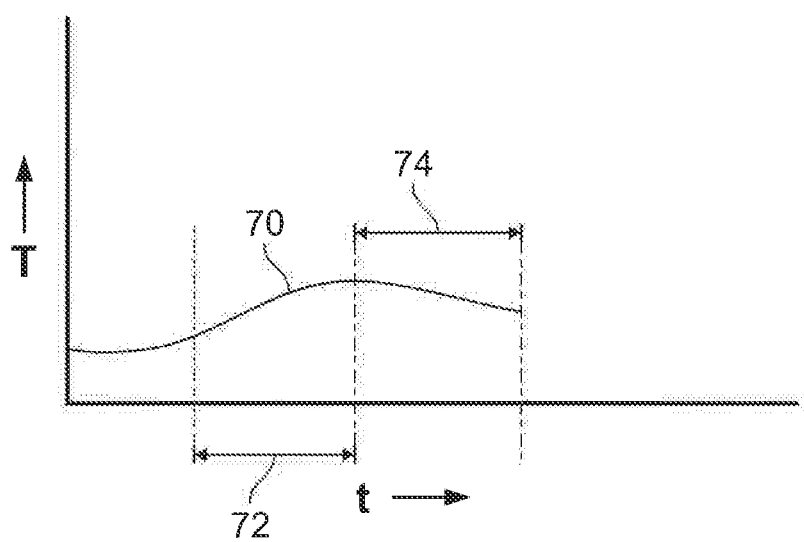
FIG. 8 is a plot of temperature for one temperature sensor over time showing intervention activities such as may be used to test strategies for providing improved temperature uniformity.

Referring to FIG. 8, one embodiment the invention contemplates a heuristic correction process in which the temperature 70 of the outlier sensor 45' is monitored over time during an intervention period 72 and a non-intervention period 74. During the intervention period 72, the control of the oven may be varied as described above in an attempt to eliminate the dead zone 66 and normal oven control may be returned during the non-intervention period 74. A favorable difference in temperature between these two different periods 72 and 74 (indicating better temperature homogeneity) identifies a successful intervention technique, and thus the successful intervention technique may be adopted for the remainder of a given portion of the cooking schedule to reduce or eliminate temperature dead zone 66.

On the other hand, if there is no significant effect on the dead zone 66 from the intervention technique or insufficient change to correct a significant temperature inhomogeneity between the periods of intervention 72 and nonintervention 74, a different intervention technique may be tried. For example, if the first intervention technique was a change in fan speed, a second intervention technique of change in fan rotation direction might be employed. Different patterns of fan operation and speeds can also be considered different intervention techniques. To the extent that the intervention techniques are orthogonal (fan direction speed and fan rotation), multiple such techniques may be employed simultaneously. Additional control strategies may include compensation strategies such as slightly increasing the cooking temperature or the cooking time to ensure that food in the cold dead zones is properly cooked.

Referring now again to FIG. 3, at decision block 80, a similar analysis may be performed with respect to the reducing the stratification indicated by rise values 56 for each axis. Stratification above a certain amount may trigger the execution of the stratification correction process per process block 82 independently or in addition to the correction of dead zone 66 of process block 64. While certain stratification may be expected and tolerated (particularly when convection baking is not employed) stratification above a predetermined amount will invoke a correction technique.

The techniques to reduce stratification may be similar to those used to address dead zone 66 but may also include, for example, burst operation of the fan 18 for periods of time insufficient for convection cooking but sufficient to break up stratification. A change in the power level of the heater and its duty cycle may also be employed. In addition, a slight increase in the control set point temperature or cooking time may be adopted to ensure proper cooking of food in the low temperature portions of the stratification.

In one embodiment, control of the fan 18 may occur through an interventional technique that is separate from normal fan 18 control that may occur during normal convention cooking or steam generation. The interventional technique may occur when fan 18 is not normally operating but stratification is detected. It is understood that during normal operation, the fan 18 is operated according to the preselected cooking schedule.

As previously discussed, stratification may be detected when two conditions are met. First, the absolute temperatures of the multiple sensors 45, for example, the average temperature of the multiple sensors 45, is above a predetermined threshold value (e.g., above 100 or 150 degrees Fahrenheit). This predetermined threshold value may ensure that the interventional technique does not initiate when the oven is at low temperatures or when the oven is still heating up. Second, there is a temperature difference among or between the multiple sensors 45 that is above a predetermined temperature difference, such as five to ten degrees Fahrenheit, indicating stratification.

Once the two conditions are met, the interventional technique is initiated to activate operation of the fan 18. The fan 18 may be operated to create a "burst" of air that lasts for a predetermined amount of time, such as less than thirty seconds or less than ten seconds or less than five seconds. The burst operation occurs for a predetermined "stirring time" used to break up stratification without disrupting the normal cooking operation, thus creating a tradeoff between breaking up stratification and disrupting the cooking operation. A predetermined amount of time may be allowed to pass before the multiple sensors 45 are sampled and the stratification conditions are tested again to allow for correction lag to catch up.

In addition or alternatively to such correction techniques, the user may be notified of extreme stratification in order to consider rearrangement of the food on the oven racks or to compensate in other ways. The amount of tolerated stratification may be a component of the cooking schedule.

Generally process blocks 64 and 82 may be executed concurrently.

Figure 7:
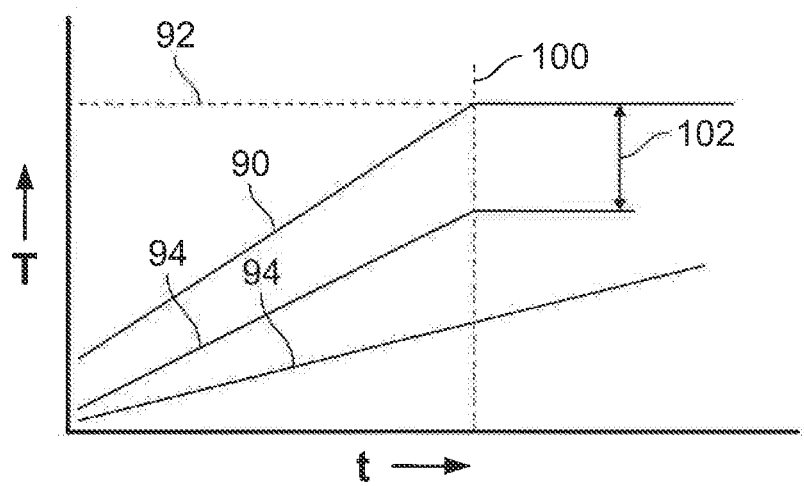
FIG. 7 is a plot of average temperature derived from the temperature sensors versus probe temperature showing one method of distinguishing between a free and inserted probe to trigger the calibration of the probe.

Referring now to FIGS. 2, 3 and 7, the increased accuracy of temperature measurement provided by the multiple temperature sensors of the present invention may permit this temperature value to be used for calibration of the probe 17. If it is determined that "outlier" probe 17 has failed, then information to this effect is outputted to the user for replacement or repair of probe 17 prior to calibration of the probe 17. Such calibration may occur when the probe 17 is placed in the holster 26 and not when the probe 17 is placed in food being cooked and not when food is within the oven so as to reduce the effect of dead zones on probe 17. Such placement in the holster 26 may be, for example, indicated by an electrical grounding of the probe detectable by the controller 37 or a switch in the holster 26 or the like.

Alternatively, the placement of the probe 17 outside of a food product may be detected by monitoring the changes in temperature of the probe with changes in the average oven temperature. As shown in FIG. 7, as the composite oven cavity temperature 90 derived from the sensors 45 rises to a desired set point temperature 92, a probe 17 outside of the food product will exhibit a tracking rise in the probe temperature 94 being offset from oven cavity temperature 90 but being of generally similar slope and related to the oven cavity temperature 90 by a constant factor and constant offset. In contrast, a temperature rise of the probe temperature 94 when it is in a food product will have a substantially different slope (being shielded by the thermal mass of the food) and will not exhibit the plateauing occurring simultaneously in oven cavity temperature 90 and probe temperature 94 which are generally in closer thermal communication with differing offsets only because of calibration issues. As a result, the offset between the probe temperature 94 and the oven cavity temperature 90 in this case will vary significantly.

In an alternative embodiment, outlier detection and calibration of probe 17 in food product may occur by extrapolating the asymptotic temperature that the probe temperature would obtain after reaching a plateauing temperature consistent with the temperature achieved if the probe was outside of the food product.

Once probe temperature 94 is analyzed or other knowledge is available indicating that the probe 17 is in the holster 26, as indicated by decision block 104, at a point in time 100 where oven cavity temperature 90 substantially stabilizes at the desired set point temperature 92, an offset value 102 may be measured between oven cavity temperature 90 and probe temperature 94 and added to curve 94 to essentially calibrate the probe 17 per process block 106. This offset value 102 may be used for all subsequent oven operations before a succeeding calibration process.

It will be appreciated that the determinations of decision block 62, 80, and 104 may be performed at a time when steam is not being introduced into the oven cavity 14, or alternatively separate determinations may be made per each of decision blocks 62, 80, and 104 in each operating mode of steam, convection, and neither steam nor convection to provide greater temperature accuracy. In addition, the information collected from the temperature sensors 45 (and probe 17) may be collected to develop empirical records for temperatures for a given cooking schedule selected by the user. These empirical values may be compared to actual values obtained during execution of those cooking schedules to better indicate acceptable and non-acceptable temperature deviations thus providing de facto standards for acceptable levels of stratification or the existence of cold spots that nevertheless do not interfere with proper cooking. These empirical values may be updated periodically during operation of the oven or may be developed in the factory and saved as such.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a control board" and "a processor" can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. A cooking oven comprising:
    an insulated housing having housing walls including a door closing to define an interior cooking cavity and opening to provide access to the cooking cavity;
    a cooking cavity heater communicating with the cooking cavity to heat the cooking cavity;
    a fan for circulating heated air through the cooking cavity;
    at least three temperature sensors coupled to interior walls of the cooking cavity and each providing a separate temperature signal; and
    an electronic controller executing a stored program upon selection of a cooking temperature set point by a user through a user interface that communicates with the electronic controller;
    wherein the electronic controller executes the stored program to:
        (i) detect the separate temperature signals of the at least three temperature sensors;
        (ii) compare the temperature signals of the at least three temperature sensors to identify an outlier sensor providing a temperature signal that deviates from a temperature derived from temperature signals of all of the sensors by a predetermined amount; and
        (iii) analyze temperature signals to determine whether the temperature signal of the outlier sensor indicates a dead zone of stagnant air in the oven or a failure of the outlier temperature sensor and in the former case changing operation of the fan to eliminate the dead zone.

2. The cooking oven of claim 1 wherein the at least three temperature sensors are compared to determine whether there is a temperature difference above a predetermined amount.

3. The cooking oven of claim 2 wherein three temperature sensors are on separate walls of the interior cooking cavity.

4. The cooking oven of claim 2 wherein three temperature sensors are vertically separated to detect temperature stratification.

5. The cooking oven of claim 1 wherein the fan is operated at different operating speeds based upon the compared temperature signals.

6. The cooking oven of claim 5 wherein the fan is operated at different directions of rotation based upon the compared temperature signals.

7. The cooking oven of claim 6 wherein the cooking oven further comprises a steam generator generating steam within the cooking cavity.

8. The cooking oven of claim 7 wherein the electronic controller further operates the steam generator based on the compared temperature signals to adjust steam generation.

9. The cooking oven of claim 6 wherein the electronic controller changes the cooking temperature set point based on the compared temperature signals.

10. The cooking oven of claim 6 wherein the electronic controller further operates the cooking cavity heater based on the compared temperature signals to change power level or duty cycle of the heater.

11. The cooking oven of claim 1 wherein the user selects a preprogrammed cooking schedule for cooking a particular food at a time-defined cooking temperature set point.

12. The cooking oven of claim 1 wherein the user receives a notification on the user interface indicating a recommendation to rearrange food or oven racks.

13. The cooking oven of claim 1 wherein the electronic controller further executes the stored program to:
evaluate whether there is a correlation between the temperature sensed by the outlier sensor and a calculated oven cavity temperature indicating a dead zone or no correlation between the temperature sensed by the outlier sensor and a calculated oven cavity temperature indicating a sensor failure.

14. The cooking oven of claim 13 wherein the electronic controller further executes the stored program to:
save a history of temperature signals from the outlier over time; and
analyze the history of temperature signals to determine if the temperature continues to deviate from the temperature sensed by the other sensors over time indicating probe failure.

15. The cooking oven of claim 14 wherein the user receives a notification on the user interface indicating sensor failure.

16. The cooking oven of claim 1 further comprising a temperature probe sensor insertable into food and held within the cooking cavity wherein the electronic controller executes the stored program to:
(i) stabilize an oven cavity temperature at a cooking temperature set point;
(ii) measure an offset value between the oven cavity temperature and a probe sensor temperature; and
(iii) include the offset value to the probe sensor temperature to calibrate the probe.

17. A cooking oven comprising:
an insulated housing having housing walls including a door closing to define an interior cooking cavity and opening to provide access to the cooking cavity;
a cooking cavity heater communicating with the cooking cavity to heat the cooking cavity;
a fan for circulating heated air through the cooking cavity;
at least two temperature sensors coupled to interior walls of the cooking cavity and each providing a separate temperature signal; and
an electronic controller executing a stored program upon selection of a cooking temperature set point by a user through a user interface that communicates with the electronic controller;
wherein the electronic controller executes the stored program to:
(i) detect the temperature signals of the at least two temperature sensors;
(ii) determine a temperature stratification within the cooking cavity based on the temperature signals of the at least two temperature sensors and a temperature difference between the at least two temperature sensors that is above a predetermined temperature difference indicating temperature stratification; and
(iii) control operation of the fan based on the temperature stratification within the cooking cavity to reduce temperature stratification.

18. The cooking oven of claim 17 wherein two temperature sensors are vertically separated to detect temperature stratification.

19. The cooking oven of claim 17 wherein control operation of the fan based on the temperature stratification comprises of predetermined burst intervals of less than thirty seconds.

* * * * *